United States Patent [19]

Strunk

[11] Patent Number: 5,406,185
[45] Date of Patent: Apr. 11, 1995

[54] TWO-PHASE INVERTER DRIVE FOR A THREE-PHASE MOTOR

[76] Inventor: Timothy L. Strunk, 1864 Farmview Dr., Lexington, Ky. 40515

[21] Appl. No.: 72,511

[22] Filed: Jun. 4, 1993

[51] Int. Cl.⁶ ............................................. H02P 1/26
[52] U.S. Cl. ................................... 318/767; 318/771
[58] Field of Search ............... 318/747, 748, 771, 813, 318/798, 729, 767; 323/361; 307/3; 324/54, 523; 361/23, 42; 325/551, 158 MG

[56] References Cited

U.S. PATENT DOCUMENTS

| | | |
|---|---|---|
| 3,764,855 | 10/1973 | Beachley . |
| 3,890,783 | 10/1974 | Eckart . |
| 3,975,668 | 8/1976 | Davie . |
| 4,152,640 | 5/1979 | Craig ..................................... 324/54 |
| 4,458,236 | 7/1984 | Perkins .................................... 307/3 |
| 4,473,817 | 9/1984 | Perkins .............................. 323/361 |
| 4,477,760 | 10/1984 | Kuznetsov .......................... 318/771 |
| 4,695,782 | 9/1987 | Jatnieks ............................. 318/748 |
| 4,723,104 | 2/1988 | Rohatyn ............................. 318/798 |
| 4,910,450 | 7/1990 | Parker . |

OTHER PUBLICATIONS

Hombu, A Current Source GTO Inverter with Sinusoidal Inputs & Outputs, Apr. 1987, IEEE Industry Applications vol. IA-23, No. 2, p. 247.
Bose, An Adaptive Hysteresis-Band Current Control Technique of a Voltage-Fed PWM Inverter For Machine Drive System Oct. 1990, IEEE Industrial Electronics, vol. 37, No. 5, p. 402.

Primary Examiner—William M. Shoop, Jr.
Assistant Examiner—John W. Cabeca
Attorney, Agent, or Firm—King & Schickli

[57] ABSTRACT

A low-cost means to drive a three-phase motor from a DC energy source. The low cost is achieved by requiring only two inverter circuits instead of the conventional three inverter circuits. The third input phase to the motor is grounded. Balanced three-phase power is developed across the three stator coils of the motor, resulting in normal three-phase operation, including control of rotational direction. This is accomplished by appropriately selecting the phase angle of the two active phases.

16 Claims, 2 Drawing Sheets

TWO-PHASE INVERTER DRIVE FOR A THREE-PHASE MOTOR

BACKGROUND

1. Field of Invention

This invention relates to inverting or transmitting electrical power to a motor.

BACKGROUND

2. Description of Prior Art

The common and long-standing method to drive a three-phase AC motor is to apply three 120-degree-spaced AC voltages. This common method is illustrated in FIG. 1 for the case of a system with a battery 10, a three-phase DC-to-AC inverter 20, and a three-phase delta-connected induction motor 40.

The battery 10 is a DC energy source that supplies two output voltages 12 and 14. Output voltage 12 is positive X volts and output voltage 14 is negative X volts, where X is a variable that can be any practical value. The battery also has a ground 16 and internal cells 18 that actually produce the voltage potential. The operation of batteries is well defined in the literature and therefore is not discussed in detail here.

The inverter 20 takes the DC voltages 12 and 14 from battery 10 and produces three phases of AC voltage. The three phases are called V1, V2, and V3 and are made available on terminals 24, 25, and 26, respectively. The three phases are produced by the inverter circuits 21, 22, and 23, which are controlled by the logic circuit 30. The voltage waveforms V1, V2, and V3 approximate sine waves with amplitude X and with phase shifts of 30, 150, and 270 degrees, respectively, for forward motor rotation, as detailed in Eqs. 1a through 3a. For reverse motor 40 rotation, the logic circuit 30 changes the sign of the phase angles for V1, V2, and V3 as detailed in Eqs. 1b through 3b. The accuracy to which these waveforms approximate the exact shape of a sine wave depends on the design of the inverter circuits 21, 22, and 23, as well as the logic circuit 30. For the purpose of discussion, we will assume that V1, V2, and V3 each has the exact shape as a sine wave. However, the accuracy of their waveshape is not critical to the present invention.

The following equations describe inverter output voltages for forward rotation:

$$V1 = X \sin(wt+30) \tag{1a}$$

$$V2 = X \sin(wt+150) \tag{2a}$$

$$V3 = X \sin(wt+270) \tag{3a}$$

where w is the period of the sine wave in radians and t is the time variable.

The following equations describe inverter output voltages for reverse rotation:

$$V1 = X \sin(wt-30) \tag{1b}$$

$$V2 = X \sin(wt-150) \tag{2b}$$

$$V3 = X \sin(wt-270) \tag{3b}$$

The design and operation of the inverter circuits 21, 22, and 23 and of the logic circuit 30 are well documented in the prior art and therefore will not be described in detail here. For reference purposes, a typical inverter circuit is shown in FIG. 2. Its power-conducting elements are transistor Q1 10, transistor Q2 14, diode D1 12, and diode D2 16. A set of silicon-controlled rectifiers (SCRs) could be used instead of the transistors. There are other peripheral circuit components which, for simplicity, are not shown. The logic circuit 30 could be composed of a microprocessor and/or other digital and analog circuit components. It typically produces a pulse-width-modulated (PWM) signal that controls when the transistors Q1 10 and Q2 14 are turned on. It is a simple matter for the logic circuit 30 to control the phase angle of each phase, as described in the prior literature. The design details of the inverter circuits 21, 22, and 23 as well as the design details of the control circuit 30 are not pertinent to the present invention.

The motor 40 produces a useful mechanical torque from the balanced three-phase voltages Va, Vb, and Vc across the stator coils 44, 45, and 46, respectively. The three inverter 20 outputs V1, V2, and V3, on terminals 24, 25, and 26, respectively, are connected to the three motor input terminals 41, 42, and 43, respectively. The voltages on terminals 41, 42, and 43 then cause voltage waveforms Va, Vb, and Vc to be applied to coils 44, 45, and 46, respectively, which make up the stator winding of the motor. Voltage waveforms Va, Vb, and Vc are defined in Eqs. 4a through 6a for forward motor rotation and in Eqs. 4b through 6b for reverse motor rotation. These voltages then cause currents to flow, which in turn produce magnetic flux, which in turn produces torque. The design and operation of an induction motor is well defined in the prior art and thus will not be discussed in detail here. The only critical point for our discussion is to note that, in Eqs. 4, 5, and 6, the voltage waveforms Va, Vb, and Vc are balanced. In other words, they have a 120-degree phase spacing between them and have the same amplitude. This is true for both forward and reverse cases and is a critical requirement for a three-phase motor to work properly.

The following equations describe motor coil voltages for forward rotation:

$$Va = V1 - V2 = 1.73X \sin(wt+0) \tag{4a}$$

$$Vb = V2 - V3 = 1.73X \sin(wt+120) \tag{5a}$$

$$Vc = V3 - V1 = 1.73X \sin(wt+240) \tag{6a}$$

where V1, V2, and V3 are given by Eqs. 1a, 2a, and 3a, respectively.

The following equations describe motor coil voltages for reverse rotation:

$$Va = V1 - V2 = 1.73X \sin(wt+0) \tag{4b}$$

$$Vb = V2 - V3 = 1.73X \sin(wt-120) \tag{5b}$$

$$Vc = V3 - V1 = 1.73X \sin(wt-240) \tag{6b}$$

where V1, V2, and V3 are given by Eqs. 1b, 2b, and 3b, respectively.

The disadvantage of the common method illustrated is that it takes three inverter circuits, which are relatively expensive, to produce the balanced-voltage waveforms across the three stator coils of the motor.

OBJECTS AND ADVANTAGES

Accordingly, several objects and advantages of the present invention are:

(a) Only two inverter circuits are required to produce the necessary set of three balanced-voltage waveforms across the three coils of the motor, resulting in lower cost.
(b) A simpler logic circuit can be used to control a two-phase DC-to-AC inverter, resulting in lower cost.
(c) The coils of a delta-connected motor will be grounded.
(d) All of the above are accomplished without changing the design or operational characteristics of the load.

DRAWING FIGURES

In all drawings, the solid lines indicate circuit elements and conductors, and the dashed lines indicate the system components of battery, inverter, and motor.

Figure 1:
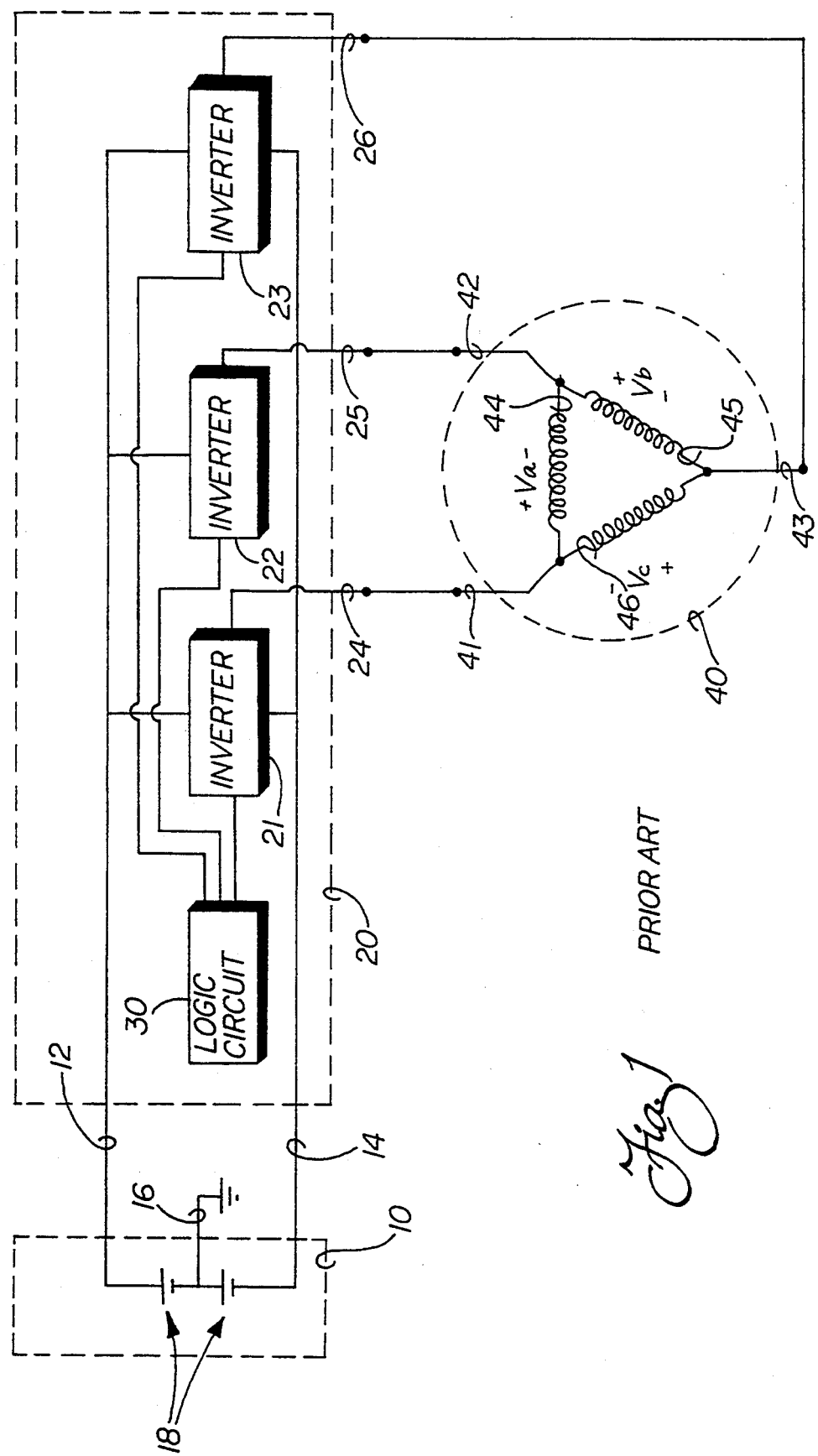
FIG. 1 shows a conventional three-phase inverter drive, with three direct current (DC) to alternating current (AC) inverter circuits.
Figure 2:
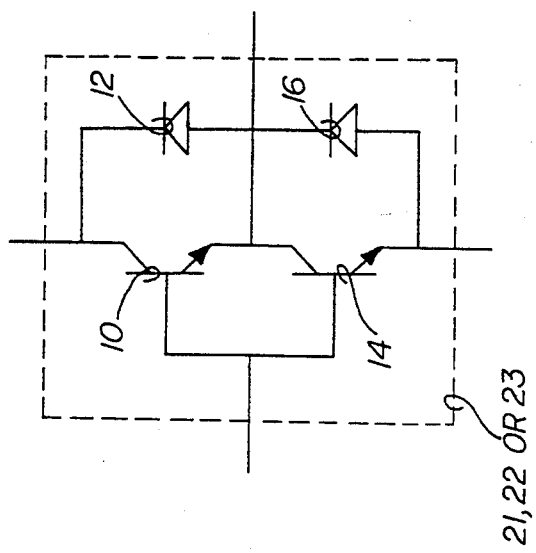
FIG. 2 shows a typical inverter circuit that performs the DC-to-AC inversion for one phase.
Figure 3:
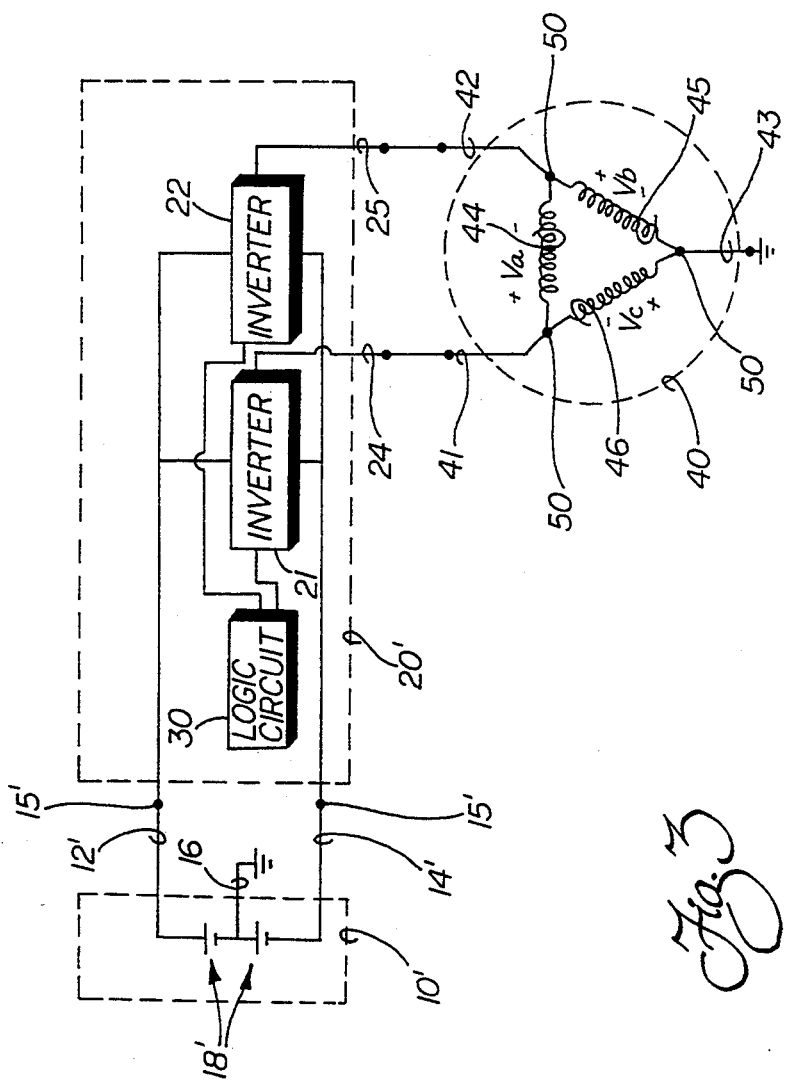
FIG. 3 shows the disclosed two-phase inverter drive for a three-phase motor.

| Numerals used in FIG. 1 for prior art: | Prime numerals used in FIG. 3 for features of the present invention that are different from the prior art: |
|---|---|
| 10 battery | 10' battery |
| 12 + output voltage | 12' + output voltage |
| 14 − output voltage | 14' − output voltage |
| 16 ground | |
| 18 voltage cells | 18' voltage cells |
| 20 inverter | 20' inverter |
| 21 phase #1 inverter | |
| 22 phase #2 inverter | |
| 23 phase #3 inverter | |
| 24 phase #1 terminal | |
| 25 phase #2 terminal | |
| 26 phase #3 terminal | |
| 30 logic circuit | 30' logic circuit |
| 40 motor | |
| 41 phase #1 terminal | |
| 42 phase #2 terminal | |
| 43 phase #3 terminal | |
| 44 phase a coil | |
| 45 phase b coil | |
| 46 phase c coil | |
| Numerals used in FIG. 2 for typical inverter: | |
| 50 upper transistor | |
| 52 upper diode | |
| 54 lower transistor | |
| 56 lower diode | |

DESCRIPTION AND OPERATION OF PRESENT INVENTION

A typical embodiment of the closure of the present invention, a two-phase inverter for a three-phase motor, is illustrated in FIG. 3. The features that are different from the previously discussed, common three-phase inverter for a three-phase motor are as follows:
(a) There are only two inverter circuits 21 and 22.
(b) The inverter's 20' output names are V1' and V2'.
(c) The battery 10' output voltages 12' and 14' are +1.73 X volts and −1.73 X volts, respectively.
(d) The phase angle for the second phase is either +60 or −60 degrees relative to the first phase, depending on desired rotation direction.
(e) The third phase is grounded.
(f) The logic circuit 30' controls only two inverter circuits.

The battery 10' is a DC energy source that supplies two output voltages 12' and 14'. Output voltage 12' is +1.73 X volts and output voltage 14' is −1.73 X volts. These voltages were increased by the multiplier factor 1.73 over battery 10 output voltages so that the resulting voltages Va, Vb, and Vc across each of coils 44, 45, and 46 would be identical for either the two-phase inverter 20' or the three-phase inverter 20. The battery also has a ground 16 and internal cells 18' that actually produce the voltage potential.

The inverter 20' receives on inputs 15 the DC voltages 12' and 14' from battery 10' and produces two phases of AC voltage, which are called V1' and V2' and which are made available on terminals 24 and 25, respectively. The two phases are produced by the inverter circuits 21 and 22, which are controlled by the logic circuit 30'. The voltage waveforms V1' and V2' approximate sine waves with amplitude 1.73 X volts and with phase shifts of 0 and −60 degrees, respectively, for forward motor rotation, as detailed in Eqs. 7a through 9a. For reverse motor 40 rotation, the logic circuit 30' changes the phase angle for V2' as detailed in Eqs. 7b through 9b. The accuracy to which V1' and V2' approximate the exact shape of a sine wave is not critical and depends on the design of the inverter circuits 21 and 22, as well as of the logic circuit 30'. For the purpose of discussion, we will assume that V1' and V2' each has the exact shape as a sine wave.

The following equations describe the two-phase inverter output voltages for forward rotation:

$$V1' = 1.73X \sin(wt+60) \quad (7a)$$

$$V2' = 1.73X \sin(wt+0) \quad (8a)$$

The following equations describe the two-phase inverter output voltages for reverse rotation:

$$V1' = 1.73V \sin(wt-60) \quad (7b)$$

$$V2' = 1.73V \sin(wt+0) \quad (8b)$$

The design and operation of the inverter circuits 21 and 22 and of the logic circuit 30' are well documented in the prior art and thus will not be described in detail here. The typical inverter circuit shown in FIG. 2 is still valid for the two-phase inverter.

The motor 40 produces a useful mechanical torque from the balanced three-phase voltages Va, Vb, and Vc across the stator coils 44, 45, and 46, respectively. As should be appreciated from reviewing FIG. 3, the three stator coils or phase windings 44, 45 and 46 are operatively connected through three cooperating nodes 50 to three input terminals 41, 42, 43. The two-phase inverter 20' outputs V1' and V2', on terminals 24 and 25, respectively, are connected to the motor input terminals 41 and 42, respectively. The third motor terminal 43 is simply connected to ground. The voltages on terminals 41, 42, and 43 then cause voltage waveforms Va, Vb, and Vc to be applied to coils 44, 45, and 46, respectively, which make up the stator winding of the motor. Voltages Va, Vb, and Vc are defined in Eqs. 10a, 11a, and 12a for forward motor rotation and in Eqs. 10b, 11b, and 12b for reverse motor rotation. The voltages Va, Vb, and Vc then cause currents to flow, which in turn produce magnetic flux, which in turn produces torque. The design and operation of a three-phase motor is well defined in the prior art and therefore will not be discussed in detail here. The only critical point for our discussion is to note that, in Eqs. 10, 11, and 12, the voltage waveforms Va, Vb, and Vc are balanced. In other words, they have a 120-degree phase spacing between them and have the same amplitude. This is true for both forward and reverse cases and is a critical requirement for a three-phase induction motor to work properly. In fact, a comparison of Va, Vb, and Vc in Eqs. 10, 11, and 12 for the two-phase inverter 20' with their counterparts in Eqs. 4, 5, and 6 for the three-phase inverter 20 reveals that the coil voltages Va, Vb, and Vc are exactly the same!

The two-phase inverter coil equations for forward rotation are:

$$Va = V1' - V2' = 1.73X \sin(wt + 0) \quad (10a)$$

$$Vb = V2' - V3' = 1.73X \sin(wt + 120) \quad (11a)$$

$$Vc = V3' - V1' = 1.73X \sin(wt + 240) \quad (12a)$$

where V1' and V2' are given in Eqs. 7a and 8a, respectively, and V3' is zero. The two-phase inverter coil equations for reverse rotation are:

$$Va = V1' - V2' = 1.73X \sin(wt + 0) \quad (10b)$$

$$Vb = V2' - V3' = 1.73X \sin(wt - 120) \quad (11b)$$

$$Vc = V3' - V1' = 1.73X \sin(wt - 240) \quad (12b)$$

The most important features of the described two-phase inverter 20' are (1) that it has only two inverter circuits 21 and 22 and (2) that the phase angle for the second phase V2' is chosen appropriately to compensate for having only two inverter circuits! The novel idea in this invention is that only two active phases are required to drive a three-phase motor if the two active phases have appropriately chosen phase angles. The importance of this idea is that a lower cost inverter for a three-phase motor can be achieved. That this idea is not obvious is clear, since it allows for a significant cost reduction yet it is neither used in practice nor mentioned in the prior art.

THEORY OF OPERATION FOR PRESENT INVENTION

It is not obvious that two active phases and a grounded phase applied to a three-phase motor could result in balanced voltages across the motor's stator coils. However, thoughtful consideration of Eqs. 13, 14, and 15 will lead to the conditions that the two active phases must meet in order to accomplish balanced voltages across the three stator coils. Eq. 13 is a general equation that defines the resultant waveform Va when the second active phase V2' is subtracted from the first active phase V1', according to the polarity convention defined for Va in FIG. 3. Eqs. 14 and 15 are general equations that define the waveforms Vb and Vc, respectively. The correctness of Eqs. 13, 14, and 15 can be verified by examining FIG. 3.

The variables in Eq. 13 are PA1, the phase angle for the first phase; PA2, the phase angle for the second phase; PAa, the resulting phase angle for the voltage Va; and Vp, the resulting peak amplitude for Va. The peak amplitudes for V1' and V2' are set to unity (1.0) to simplify the analysis.

$$\begin{aligned} Va &= V1' - V2' \\ &= \sin(wt + PA1) - \sin(wt + PA2) \\ &= Vp \sin(wt + PAa) \end{aligned} \quad (13)$$

$$\begin{aligned} Vb &= V2' \\ &= \sin(wt + PA2) \end{aligned} \quad (14)$$

$$\begin{aligned} Vc &= -V1' \\ &= -\sin(wt + PA1) \\ &= \sin(wt + PA1 + 180) \end{aligned} \quad (15)$$

To further simplify the analysis, let PA1 be equal to zero. The four conditions for a two-phase inverter to properly drive a three-phase motor are as follows:

(1) The phase angle of the second phase, PA2, must be 60 degrees from the phase angle of the first phase, PA1. This is true since the sum of 180 degrees and PA1 must be 120 degrees from PA2, as dictated by Eqs. 14 and 15. Thus, in the case where PA1 is zero, PA2 must be either +60 degrees or −60 degrees.

(2) When the second phase, V2', is subtracted from the first phase, V1', the resulting waveform, Va, must have the same amplitude as V1' and V2'. Therefore, Vp in Eq. 13 must be unity since the amplitudes for V1' and V2' are unity.

(3) When the second phase, V2', is subtracted from the first phase, V1', the resulting waveform, Va, must have a phase angle that is 120 degrees from V2'. Therefore, PAa must be 120 degrees from PA2, as dictated by Eqs. 13 and 14.

(4) There must exist two values of PA2 which satisfy the above three conditions and these two values must be of equal magnitude and of opposite sign.

Table 1 lists the resulting values of Vp, PAa, and PA2 minus PAa over the range of possible values for PA2.

TABLE 1

| Vp and PA2 - PAa vs PA2, with PA1 = 0 | | | |
|---|---|---|---|
| PA2 (degrees) | Vp (volts) | PAa (degrees) | PA2 − PAa (degrees) |
| 0 | 0 | 0 | 0 |
| 30 | 0.517 | −75 | 105 |
| 60 | 1.000 | −60 | 120 |
| 90 | 1.414 | −45 | 135 |
| 120 | 1.732 | −30 | 150 |
| 150 | 1.932 | −15 | 165 |
| 180 | 2.000 | 0 | 180 |
| −150 | 1.932 | 15 | −165 |
| −120 | 1.732 | 30 | −150 |
| −90 | 1.414 | 45 | −135 |
| −60 | 1.000 | 60 | −120 |
| −30 | 0.517 | 75 | −105 |

Examining Table 1 reveals that the first three conditions are met when PA2 is +60 degrees and when PA2 is −60 degrees! And the fourth condition is met since there are two values of PA2 of opposite sign and equal magnitude that satisfies the first three conditions. Therefore, if the phase angle difference between PA1 and PA2 is +60 degrees, a two-phase inverter can drive a three-phase motor in one direction. And when the difference between PA1 and PA2 is −60 degrees, a two-phase inverter can drive a three-phase motor in the other direction!

To make the comparison between the three-phase inverter and the two-phase inverter easier in the "Description and Operation of Present Invention", PA1 was chosen to be 60 degrees and PA2 to be 0 degrees for the forward rotation case, as shown in Eqs. 7a and 8a. Any other values that are 60 degrees apart could have been used.

SUMMARY, RAMIFICATION, AND SCOPE

Accordingly, the reader will see that the two-phase inverter drive does indeed provide for balanced voltages of equal amplitude and phase spacing of 120 degrees across the respective stator coils of a three-phase motor. The two-phase inverter drive also provides for direction control. Furthermore, the two-phase inverter drive has additional advantages in that:

(1) it is low cost since it only requires two inverter circuits, instead of the three required by a conventional three-phase inverter, (2) it is low cost since the control circuit is simpler, and (3) it allows for the windings of a delta-connected motor to be grounded.

Although the preceding description contains many specificities, these should not be construed as limiting the scope of the invention but as merely providing illustrations of some of the currently preferred embodiments of this invention. For example, the motor being controlled could be a brushless DC motor. Thus the scope of the invention should be determined by the appended claims and their legal equivalents, rather than by the examples given.

I claim:

1. A method of driving a three-phase electric motor, including three phase windings operatively connected through three cooperating nodes to three input terminals, with an inverter, comprising:
    continuously grounding a first individual input terminal of said three-phase electric motor; and
    applying electrical power with predetermined characteristics to a second and a third input terminal of said three-phase electric motor.

2. A method of driving a three-phase electric motor, including three phase windings operatively connect through three cooperating nodes to three input terminals, with an inverter, comprising:
    continuously grounding a first individual input terminal of said three-phase electric motor; and
    applying alternating voltage/current waveforms to a second and a third input terminal, said alternating voltage/current waveforms having a predetermined phase angle therebetween of substantially sixty degrees.

3. The method as set forth in claim 2, wherein said alternating voltage/current waveforms have substantially identical amplitudes.

4. The method as set forth in claim 3, wherein said alternating voltage/current waveforms have substantially a sine wave shape.

5. An apparatus for operatively connecting a D.C. electrical energy source with a three-phase electric motor, comprising:
    an inverter including a pair of inputs operatively connected to the D.C. electrical energy source and a pair of outputs operatively connected to a pair of input terminals of the three-phase electric motor; and
    means for continuously electrically grounding a third individual input terminal of said three-phase electric motor;
    said inverter further including a means for producing two alternating voltage/current waveforms having predetermined characteristics whereby the three-phase motor is driven.

6. The apparatus as set forth in claim 5, wherein said alternating voltage/current waveforms produced have a phase angle therebetween of substantially sixty degrees.

7. The apparatus as set forth in claim 6, wherein said alternating voltage/current waveforms produced have substantially identical amplitudes.

8. The apparatus as set forth in claim 7, wherein said alternating voltage/current waveforms produced have substantially a sine wave shape.

9. The apparatus as set forth in claim 5, wherein said means for producing two alternating voltage/current waveforms comprises a first inverter, a second inverter and a logic control circuit operatively connected to said first and second inverter.

10. A motor drive system, comprising:
    a D.C. electrical energy source;
    a three-phase electric motor; and
    an inverter for interconnecting said D.C. electrical energy source with said three-phase electric motor;
    said inverter including a pair of inputs operatively connected to the D.C. electrical energy source and a pair of outputs operatively connected to a pair of input terminals of the three-phase electric motor; and
    means for continuously electrically grounding a third individual input terminal of said three-phase electric motor;
    said inverter further including a means for producing two alternating voltage/current waveforms having predetermined characteristics whereby the three-phase motor is driven.

11. The motor drive system as set forth in claim 10, wherein said alternating voltage/current waveforms produced have a phase angle therebetween of substantially sixty degrees.

12. The motor drive system as set forth in claim 11, wherein said alternating voltage/current waveforms produced have substantially identical amplitudes.

13. The motor drive system as set forth in claim 12, wherein said alternating voltage/current waveforms produced have substantially a sine wave shape.

14. The motor drive system as set forth in claim 10, wherein said means for producing two alternating voltage/current waveforms comprises a first inverter, a second inverter and a logic control circuit operatively connected to said first and second inverter.

15. The motor drive system as set forth in claim 10, wherein said three-phase electric motor is an AC motor.

16. The motor drive system as set forth in claim 10, wherein said three-phase electric motor is a brushless D.C. motor.

* * * * *